Nov. 24, 1936.    B. O. CUDDIGAN    2,061,694
CULTIVATOR
Filed Oct. 1, 1934
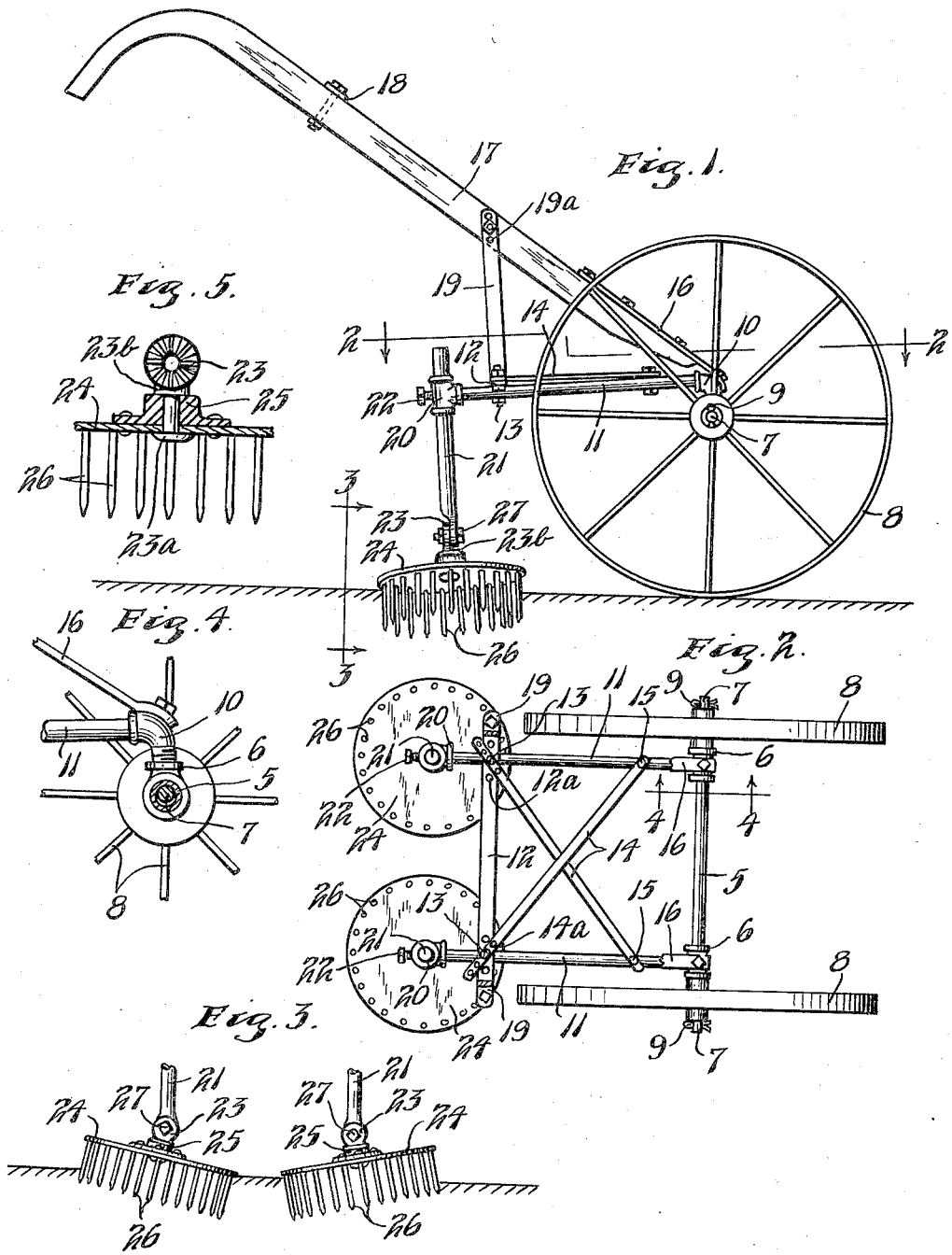
INVENTOR
B. O. CUDDIGAN.
BY HIS ATTORNEYS
Williamson & Williamson Patented Nov. 24, 1936

2,061,694

UNITED STATES PATENT OFFICE 2,061,694

CULTIVATOR

Bartholomew O. Cuddigan, Wadena, Minn., assignor of one-third to John Schaefer, St. Cloud, and one-third to Ben J. Mondloch, St. Martin, Minn.

Application October 1, 1934, Serial No. 746,367

4 Claims. (Cl. 97—179)

This invention relates to cultivators which, although capable of other uses, are particularly adapted for use in cultivating row crops.

It is the general object of the invention to provide a novel and improved cultivator of cheap and simple construction, which can be effectively used for cultivating row crops.

To this end, generally stated, the invention consists in the novel parts and novel combinations of parts hereinafter defined in the claims and described in the following specification, made in connection with the accompanying drawing, wherein like reference characters refer to the same or similar parts throughout the various views, and, in which, Fig. 1 is a view in side elevation illustrating a hand cultivator embodying the invention;

Fig. 2 is a section taken on the line 2—2 of Fig. 1, as indicated by the arrows;

Fig. 3 is a section taken on the line 3—3 of Fig. 1, as indicated by the arrows, the rotating heads being shown in a slightly different inclination than as shown in Fig. 1;

Fig. 4 is a vertical section taken on the line 4—4 of Fig. 2, as indicated by the arrows; and Fig. 5 is a section through one of the revolving heads.

Although the invention may be incorporated in a horse drawn cultivator, a power drawn cultivator or a hand cultivator, it is illustrated and described as applied to a hand cultivator. In accordance with the embodiment of the invention illustrated, there is provided a wheeled frame which includes a tube 5 having T-fittings 6 at its two ends and through which a shaft 7 extends. A pair of wheels 8 are mounted for rotation on the shaft 7, one at the outer side of each fitting 6 and these wheels are held from lateral shifting movement by the fitting 6 and by cotter pins 9 at the ends of the shaft 7. Having screw threaded connection with the T-fittings 6 and upstanding therefrom are elbows 10 to which rearwardly extending arms 11 in the form of pipes are connected. Although the arms 11 are shown in Fig. 2 of the drawing as being disposed in substantially parallel relation, the rear ends of these arms may be swung closer together or farther apart as desired, and the rear ends of the arms are secured in the desired adjusted spaced relation by means of a bar 12 having a plurality of openings 12a near its ends through any of which nutted bolts 13, passing through rearward portions of the arms 11, may extend. To brace the arms 11 when adjusted to and from each other as desired at their rear ends, there are provided a pair of crossed brace links 14 which are pivotally connected at their forward ends by pivots 15 to forward portions of the arms 11. These links at their rear ends are provided with a plurality of bolt openings 14a through certain of which the nutted bolts 13 extend. Secured to the elbows 10 are straps 16 connected to handle equipped shanks 17 of the usual type used in hand cultivators. The handle equipped shanks 17 are cross connected by link 18 and they are connected to the ends of the bar 12 by means of straps 19 having a number of bolt openings 19a at their upper ends for reception of bolts securing the straps to the shanks whereby the handle equipped shanks can be adjustably set at the desired inclination relative to the arms 11.

T's 20 are centrally connected to the rear ends of the arms 11 and slidably extending through the two opposite mouths of the T's are shanks 21. These shanks are vertically slidable upwardly and downwardly in the T's 20 and they are also rotatable relative to the T's, the shanks being secured from sliding movement and rotation when adjusted, as desired, by means of set screws 22 received within the T's 20. The lower ends of the shanks 21 are flattened as shown and one surface of the flattened portion of each shank is roughened for engagement with the roughened surface of the flattened upper end of a pin 23. The two pins 23 have enlarged heads 23a at their lower ends and shoulders 23b spaced above their heads. Disks 24 bearing against the heads 23a of the pins 23 are revolubly mounted on these pins and these disks carry at their centers hubs 25 which extend between the shoulders 23b and the disks. A multiplicity of ground working teeth 26 are mounted on each disk 24 and these teeth are preferably located adjacent the circumferential edge of the disk in circumferentially spaced relation. In the form shown, these teeth 26 are merely pins sharpened at their lower ends. It will be appreciated that other types of ground working tools may be substituted for the teeth 26 shown. The disks 24, hubs 25 and teeth 26 form the revolving heads of the cultivator. Nutted bolts 27 extend through the flattened surfaces of the respective shanks 21 and pins 23 and by loosening these bolts it will be seen that the inclination of the revolving heads relative to the shanks 21 may be adjusted, whereupon the nutted bolts may be tightened to hold the heads set at the desired adjusted angle.

The cultivator of the invention is particularly adapted for use in cultivating row crops. Considering that the parts have been adjusted and secured in approximately the position shown in Figs. 1 and 2, the cultivator will be so located that the two wheels 8 straddle the row to be cultivated. The operator will then grasp the handles of the handle shanks 17 and swing the handle shanks downwardly to tilt the entire frame of the cultivator downwardly about the axle shaft 7 until the teeth 26 are received within the ground, as shown in Fig. 1. Of course, the inner teeth on the disks 24, when the disks are positioned as shown, will work deeper into the ground than the outer teeth and as the cultivator is pushed over the ground, the inner teeth through their ground engagement will drive the two carrying heads to rotate the same towards each other relative to the forward line of travel. As the heads rotate, the various teeth will move through the ground and when the heads are positioned as shown in Fig. 1, the forward teeth will work toward the row being cultivated and the rear teeth will work away from the row being cultivated. Every patch of ground over which the rotating heads travel will thus be doubly worked. The soil will be loosened, broken up and pulverized. Weeds in the path of the rotating heads will be uprooted and destroyed and a most efficient cultivating action will be secured. When the rotating heads are tilted, as shown in Fig. 1 and as also shown in Fig. 3, there will be some tendency of the cultivator to move soil outwardly from the row, inasmuch as the rear teeth working on the soil last will naturally carry the dirt somewhat away from the row. The opposite action will be created if the rotating heads are tilted so that their inner edges tilt upwardly relative to the ground level, i. e. when the rotating heads are oppositely tilted than as shown, the rearward teeth will work the dirt toward the row and leave it there to some extent. Naturally, the speed of travel of the cultivator over the ground will determine the extent that the soil is laterally shifted.

It is preferable in using the cultivator to position the heads so that the disks 24 tilt slightly upwardly at their forward edges, inasmuch as the teeth will then enter the ground easier than if the disks have no forward tilt or are rearwardly tilted.

It will be seen that the rotating heads are practically universally adjustable. By loosening the bolts 13 to disconnect the bar 12 and the rear ends of the braces 14 from the arms 11, the rear portions of the arms may be swung to and from each other to vary the spacing between the heads. By loosening the set screws 22, the shanks 21 may be raised or lowered to vary the forward to rear tilt of the disks 24 when the teeth 26 are forced into the ground. Also by turning the shanks 21 relative to the T's 20 the disks can be tilted in any desired direction. The tilt of the disks relative to the shanks can be adjusted by loosening the bolts 27. Adjustment of the straps 19 relative to the handle shank 17 will also be effective to change the tilt of the disks.

It will be seen that an extremely effective cultivator has been provided which is of cheap and simple construction. As stated previously, the use of the invention is not confined to hand cultivators, the invention being used in connection with other types of cultivators and ground working tools. For some purposes it may be desirable to tilt both rotating heads in the same direction and to locate the two disks close together, or one in advance of the other. Additional rotating heads, of course, may also be used. The device will be found useful as a harrow and also as a road scarifier.

It will, of course, be understood that various changes may be made in the form, details, arrangement and proportions of the various parts without departing from the scope of the present invention.

What is claimed is:—

1. A cultivator having in combination a wheel equipped axle, a pair of arms mounted for lateral swinging movement about vertical pivots on said axle, to permit variance between the spacing of certain portions of said arms, shanks carried by said portions of said arms and projecting downwardly therefrom, heads rotatably mounted on the lower portions of said shanks and angularly tilted relative to the ground and ground engaging tools carried by said heads and projecting downwardly therefrom.

2. The structure defined in claim 1, said shanks being mounted for vertical and rotative adjustment in said portions of said arms.

3. The structure defined in claim 1, said shanks and heads including means for varying the tilt of the axis of rotation of said heads relative to said shanks.

4. A cultivator having in combination an axle shaft housing, an axle shaft mounted therein, wheels carried by said shaft, a pair of arms projecting rearwardly from said housing and connected for swinging movement at their forward ends to said housing, means for connecting the rear portions of said arms in desired spaced relation, downwardly projecting shanks mounted in the rear ends of said arms for sliding vertical adjustment and rotative adjustment, pins connected to the lower ends of said shanks for adjustment angularly relative to said shanks, heads rotatably mounted on said pins and ground engaging tools carried by said heads and projecting downwardly therefrom.

BARTHOLOMEW O. CUDDIGAN.